April 17, 1962  D. GRUDIN  3,030,052
MECHANICAL REMOTE CONTROL SYSTEM
Filed Jan. 22, 1959  6 Sheets-Sheet 1

INVENTOR
DANIEL GRUDIN

BY
ATTORNEY

April 17, 1962  D. GRUDIN  3,030,052
MECHANICAL REMOTE CONTROL SYSTEM
Filed Jan. 22, 1959  6 Sheets-Sheet 3

INVENTOR
DANIEL GRUDIN

BY *Godfrey B. Speir*
ATTORNEY

April 17, 1962 D. GRUDIN 3,030,052
MECHANICAL REMOTE CONTROL SYSTEM
Filed Jan. 22, 1959 6 Sheets-Sheet 5

April 17, 1962  D. GRUDIN  3,030,052
MECHANICAL REMOTE CONTROL SYSTEM
Filed Jan. 22, 1959

INVENTOR
DANIEL GRUDIN
BY
ATTORNEY

United States Patent Office 3,030,052
Patented Apr. 17, 1962

3,030,052
MECHANICAL REMOTE CONTROL SYSTEM
Daniel Grudin, Rockaway, N.J., assignor to Curtiss-Wright Corporation, a corporation of Delaware
Filed Jan. 22, 1959, Ser. No. 788,441
4 Claims. (Cl. 244—75)

This invention relates to control systems of mechanical character, particularly though not essentially applicable to aircraft and other controllable flying objects.

Control systems to which this invention is applicable are those wherein a power source drives a power regulator and force amplifier, the output of the regulator being modulated by a low energy control input. The regulator then drives the load to a position or at a rate as called for by the low energy control input.

In aircraft of the past and in present small aircraft, manual power exerted by the pilot is adequate to operate aerodynamic control surfaces such as ailerons, rudders, elevators and wing flaps. In larger modern aircraft, particularly those for operation at high speed, the forces required to move the aerodynamic control surfaces are in excess of the power of the pilot or air crewman, so that power boost is conventionally added to the pilot's control. Power boost or force amplifying systems have largely developed along the lines of utilizing hydraulic power, and sometimes pneumatic or electro mechanical power. Such power boost systems are also utilized for secondary controls of aircraft, for missiles, and for other controllable machinery and traveling objects.

In the present invention, an object is to utilize essentially mechanical apparatus for power boost or force amplifying, and power transmission purposes, and to provide appropriate mechanical systems for such purposes which are applicable both in aircraft, flying objects and other types of machinery and traveling objects.

Further objects of the invention are:

To provide an all mechanical modulating power control system for aircraft and flying objects and other equipment;

To provide a modulating and intermittently operable power control system capable of extended operation at elevated environmental temperatures;

To provide a mechanical power control system for application of modulated power at remote locations and wherein the power transmission elements are extremely rugged, but light in weight;

To provide a power control system wherein the transmission elements connecting the power regulator or modulator to the load are relatively flexible so that they will accommodate to operating deflections of the supporting structure;

To provide connecting elements in the transmission system which are designed to avoid resonance with adverse forcing impulses during operation;

To provide power converting subsystems of mechanical character which are smooth, dependable, and rugged in operation and which can respond to both small and large demands for power, motion or control rate with great precision;

To provide power converting subsystems, to enable operation or movement of heavy loads and for converting low torque high speed input power to high torque or high force low speed load motion.

One embodiment of the invention has been chosen for illustrative purposes and is shown in the annexed drawings. This embodiment, which includes an over-all system and certain subsystems and components, is in the form of a primary aircraft flight control system. However, it will be seen as the description and claims are read, that the principles of the invention are adaptable in numerous other types of equipment wherein remote application of control power is required.

In the drawings in which similar reference characters indicate similar parts.

Figure 1:
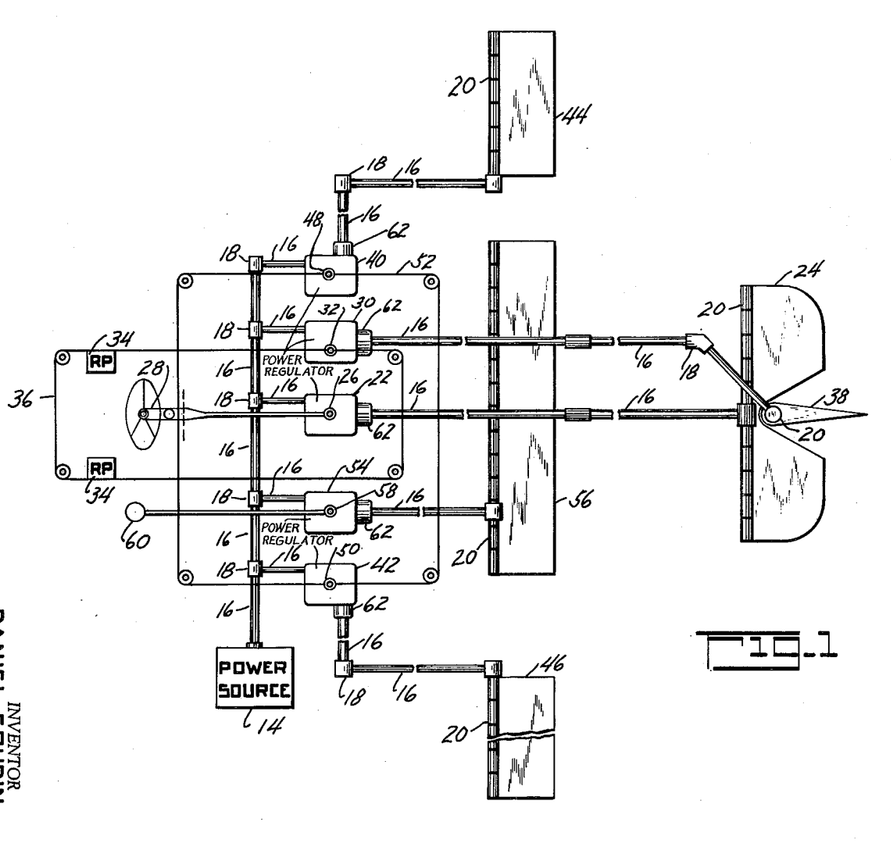
FIG. 1 is a diagram of an over-all flight control system, according to the invention, for more or less conventional aircraft.

Referring first to FIG. 1, the over-all character of the invention is shown. The various components or subassemblies of the system are shown in subsequent figures and are identified by the same reference characters as are used in FIG. 1. A power source for the system is shown at 14 and may comprise any desired sort of mechanical or electrical motor which preferably operates continuously. It may, for instance, be the primary power plant of an aircraft, or a secondary power unit. Alternatively, it may comprise a continously operating electrical, hydraulic or pneumatic motor. The output speed of the power source 14 is preferably at fairly high r.p.m., of the order of 2000 r.p.m. up to possibly 6000 r.p.m., whereby the torque in the output shafting is relatively low for the power transmitted. Power is led through increments of shafting 16 and through angle drive units 18 as required to a series of power regulators, there being one such regulator for each different service or type of load control which may be needed in the system. The outputs from the several regulators are again led through high speed shafting elements 16 and angle drives 18 as necessary to speed reducing actuators 20 by which high speed shaft motion at low torque is converted to low speed motion of the end load, at high force or torque. In the aircraft system shown, for instance, a power regulator 22 is connected through the shafting 16 to a speed reducer actuator or hinge device 20 to which the aircraft elevator 24 is attached. The power regulator 22 is provided with a control input 26 operated by fore-and-aft motion of the usual control column or stick 28. The system is arranged in the usual fashion so that forward motion of the control stick 28 operates the control input 26 to connect the power source 14 to the actuator 20 of the elevator 24 in such a fashion as to lower the elevator to produce the desired pitch-down moment on the aircraft. Rearward movement of the control stick 28 reverses the direction of movement of the shafting downstream of the power regulator 22 to raise the elevator 24. The direction of rotation of shafting upstream of the power regulators remains the same. The elevator will follow control stick motion in a position-proportional manner.

In like fashion, a power regulator 30 has its input 32 connected to rudder pedals 34 through appropriate cable connections generally referenced at 36. This power regulator 30 switches power according to operation of the control input 32 to move a rudder 38 to the right or left as desired for directional control of the aircraft.

Similarly, power regulators 40 and 42 enable operation of ailerons 44 and 46 in opposite directions as called for by right or left movement of the control stick 28 connected to control inputs 48 and 50 of the regulators 40 and 42 by a cable system 52 or other appropriate mechanical connections. Depending on design requirements, a single regulator can operate both ailerons through suitable load-dividing mechanism at the regulator output. A servomotor 54 serves to operate a landing and take-off flap 56 through the same kind of mechanical connections, through manipulation of a control input 58 by an appropriate flap control 60. Operation of the rudder pedals 34 or control stick 28 may be replaced by any other sort of operating devices, such as automatic pilots or other forms of control inputs, either automatic or manual in character. Each regulator may be provided with an output torque limiter 62, set for drive release at some selected torque value slightly under the limiting torque which the load system is capable of assuming.

Figure 2:
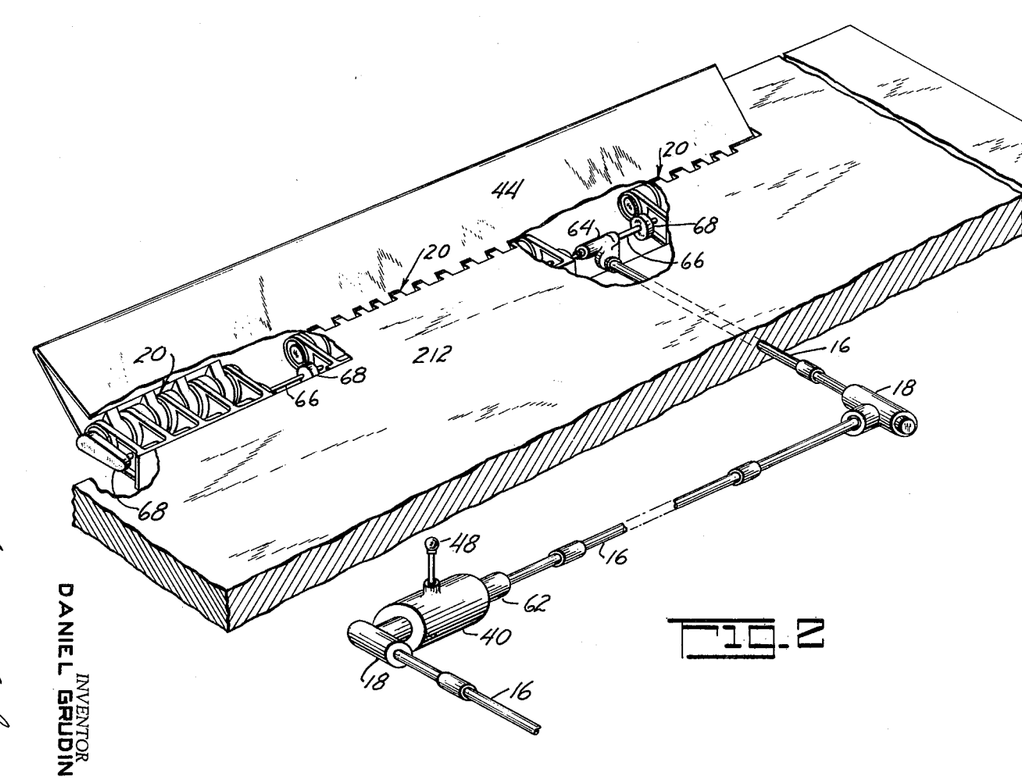
FIG. 2 is a perspective view of a single subsystem according to the invention for the operation of an aerodynamic flap such as an aileron.

FIG. 2 shows a portion of a system according to FIG. 1, which may, for example, comprise the regulator 40 for the right hand aileron 44. Here the regulator 40 feeds through shafting 16 and angle drives 18 to a gear connection 64, thence to a series of torque shafts 66 which run in unison and which are of a length which is substantially co-extensive with the span of the aileron 44. These may be articulated in the same manner as shafting 16. Drive take-offs from this shaft, as at 68, couple the shaft 66 to a plurality of sets of speed reducer actuators 20 spaced along the span of the flap or aileron so that driving load to the flap is distributed over the flap span rather than being concentrated at one load point. As will be appreciated when speed reducer hinge actuators are described in connection with FIGS. 5–7, these actuators lend themselves to pluralization to enable optimum operating power distribution to the flap.

In prior art flap arrangements, several simple flap hinges are used along the flap span, and positioning of the flap is ordinarily accomplished by applying moving force to a single lever or horn associated with the flap at some one point along its span. In high speed highly loaded aircraft, the loads which flaps are called upon to sustain, along with the inherent or moderate flexibility of flap structures, requires very strong and stiff structure in both the supporting wing and flap to enable operating load distribution and operation without stress concentration and distortion. In the present system where operating torque is applied to the flap structure at a plurality of points along its span, flap distribution under load becomes a relatively minor problem. The plural hinge devices along the flap enable effective and efficient structural arrangements which result in a system of great load capacity and light weight as compared with the arrangements of the prior art.

The particular location and disposition of power source shafting and power regulators in an aircraft is a matter of choice depending on the configuration of the aircraft and the disposition of the basic components thereof. The following general considerations would be taken into account in the location of the several components. Shafting assemblies between the power regulators and flaps to be actuated are subject to intermittent duty and can be constructed with prime reliability and with very low weight for the power to be transmitted. Shafting between the power source and the power regulators is subject to continuous duty and to a power demand depending upon the number of power regulators which such shafting serves. Such shafting in general might be somewhat heavier than that leading from power regulators to flaps due to its continuous duty requirement. Input control arrangements operate under pilot power or such devices as are required to produce input signals and these in general comprise relatively low speed moderate load connections which in the aggregate are likely to weigh as much and possibly more than high speed power shafting systems.

Since the aircraft prime movers would ordinarily be the power supply and since the designer would likely wish to derive power from either of two prime movers as security against the possibility of one prime mover failing, the ordinary disposition of the power regulators would be in the aircraft body between the prime mover and reasonably close to the pilot's control station. The intermittently operable high speed shafting from power regulators to the various flaps or loaded devices would then be carried through parts of the aircraft to terminal points. Such an arrangement, where the aircraft configuration is suitable, would probably provide the best disposition of components. However, as implied previously, component disposition is a matter of designer's choice and can be modified at will, the primary object being to maximize dependability of the system while minimizing the weight of the over-all system.

Figure 3:
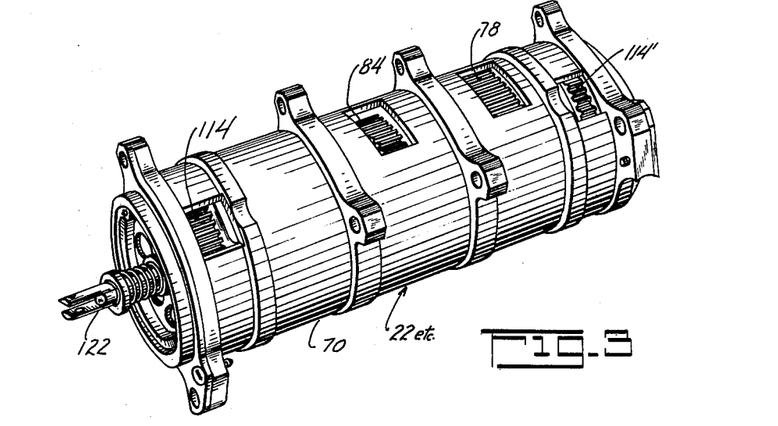
FIG. 3 is a perspective view of a suitable power control or modulating unit.
Figure 4:
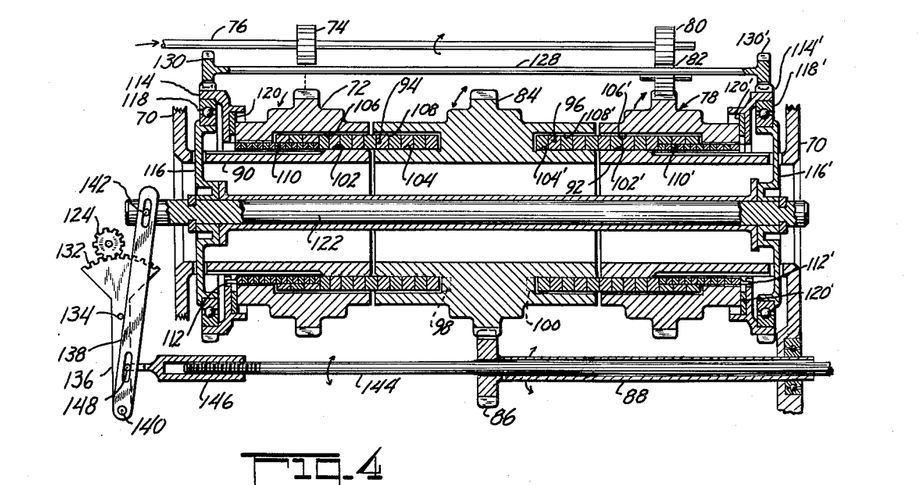
FIG. 4 is an axial section through operating portions of a power regulating unit such as that shown in FIG. 3.

FIGS. 3 and 4 show one typical construction of a mechanical position follow-up power regulator whereby prime mover is converted or selected at will to rotate high speed output shafting in either direction. The construction of this power regulator is such that when no output rotation is called for, the output shafting is locked against rotation and reverse loading. This power regulator is similar in general to the power transmission device covered in Hall et al. patent application Serial No. 747,409, filed July 9, 1958. There are certain detailed differences between the mechanism of FIGS. 3 and 4 and that described in the patent application, but its general mode of operation is the same. Since it has been fully described in the application, the description here given will not be as rigorous, but will point out major components and function.

The unit comprises a housing 70 carrying the mechanism shown in FIG. 4, this housing being contained within a cover, not shown, having supports for the mechanism not directly secured to the housing. The unit comprises an input gear 72 driven in one direction by a gear 74 on a power input shaft 76, and further comprises another input gear 78 driven from the shaft 76 in the opposite direction from gear 72 by a pinion 80 and an idler gear 82. Between the gears 72 and 78 an output gear 84 is disposed which drives a gear 86 having a shaft 88 which serves as the output for the system. Gears 72 and 78 are coaxial with fixed sleeves 90 and 92 which serve as reaction elements for braking, as will be described. Power transmission from gear 72 to gear 84 is accomplished through a precisely ground helical spring 94, and between gear 78 and gear 84 by a similar helical spring 96. The inner or right end of the spring 94 is keyed to the gear 84 at 98, and the inner or left end of the spring 96 is keyed to the gear 84 at 100.

Sleeve 90 is provided with an external cylindrical surface 102. Likewise part of the hub of gear 84 is provided with a similar external cylindrical surface 104. Both of these surfaces are normally engaged by the inner surface of spring 94, which is designed to contract on them. The hub of gear 72 is provided with an internal cylindrical surface 106 and the hub of gear 84 is provided with a similar internal cylindrical surface 108. These surfaces 106 and 108 have slight clearance relation to the outside surface of spring 94 when the latter is contracted. The leftward end of the spring 94, as shown, may be unwrapped from sleeve 90 to engage surface 106 whereupon the spring progressively unwraps along its length to expand into drive engagement with the entire surface 106 and also with the entire surface 108, whereupon driving relation is established from the gear 72 to the gear 84. When the left end of the spring 94 is relaxed it disengages the surface 106 allowing the entire spring to disengage the surface 106 and 108 and to reengage the surfaces 102 and 104. In the latter condition the spring serves to lock the output gear 84 to the sleeve 90 against rotation in the direction which had previously been induced by the gear 72.

To trigger the spring 94 into unwrapping action for use with very small control input force, a light triggering helical spring 110 is utilized, which engages the leftward end of spring 94. The leftward end of spring 110 has a tang 112, engaged with a notch in the gear 114, the latter being carried for free rotation on an axially movable plate 116 through a bearing 118. Part of the gear 114 is frictionally engageable with the left end of the gear 72 through a friction ring 120. Plate 116 is mounted on a signal input shaft 122 which may be moved to right or left through a linkage actuated by a signal input pinion 124. When the plate 116 is moved to the right, ring 120 engages the gear 72 which rotates gear 114 thereby unwrapping the left end of the spring 110, unwinding spring 94 to drivably connect gears 74 and 84. So long as such friction drive contact is maintained gear 84 will be driven with and in the same direction as gear 72. When frictional engagement between gears 114 and 72 is relaxed, driving engagement between gear 72 and gear 84 ceases and gear 84 is locked from rotation.

The rightward end of the assembly associated with spring 96, is provided with the elements similar to those described. These elements bear the same reference characters primed. These elements are oriented to afford drive in the opposite direction between gear 78 and gear 84, or to hold gear 84 from rotation in that direction which would be induced by gear 78. Thus, when there is no signal input, spring 94 locks gear 84 from rotation in one direction and spring 96 locks gear 84 from rotation in the other direction.

In order to avoid inadvertent driving energization of springs 94 and 96 concurrently, the gears 114 and 114' are constrained to rotate together by a layshaft 128 having pinions 130 and 130' at its ends which respectively mesh with gears 114 and 114'.

The input pinion 124 is connected to the input signal shaft 122 of the mechanism in the following manner. Pinion 124 meshes with a gear sector 132 having a fixed axis 134 and a lever 136 depending therefrom to which is hinged a link 138 at a pivot 140. The upper end of the link 138 is pinned to the signal input shaft 122 at 142. The power regulator output shaft 88 leads to a torque limiting device to be described, from which extends back into the mechanism, a position follow-up shaft 144 threadedly engaging a thimble 146 pivoted to the link 138 at 148. Now, as the lever 136 is rotated about its pivot 134 by the pinion 124, link 138 will pivot about 148 and shift the signal input shaft 122 in the desired direction. Output rotation is then transmitted to the shaft 88 and the shaft 144 whereby, through the threaded connection at the thimble 146, link 138 is moved to center the shaft 122, causing cessation of driving operation when the number of turns of the gear 86 is proportional to the angular movement which have been imparted to the input lever 136. Thus, rotation of the gear 86 is at all times a function of the angular turning which has been inserted through the input pinion 124. This mechanism enables the precise transmission of large amounts of power with the exertion of only minor forces at the input pinion 124. The spring clutch mechanism described normally runs at full speed when engaged and zero speed when disengaged, the time lag between engagement and disengagement being extremely short. Thus, as applied to an aircraft control system, when a control input demand is exerted, the servomotor immediately responds to the demand and moves the output at full rate to that position which was called for, whereupon further operation ceases. The mechanism responds to large or small position change demands in either direction with equal facility and the system is preferably designed so that the rate of accomplishment of any demand by the power system is no less than the maximum rate of movement which can be expected at the control input.

Figures 8, 9, 10:
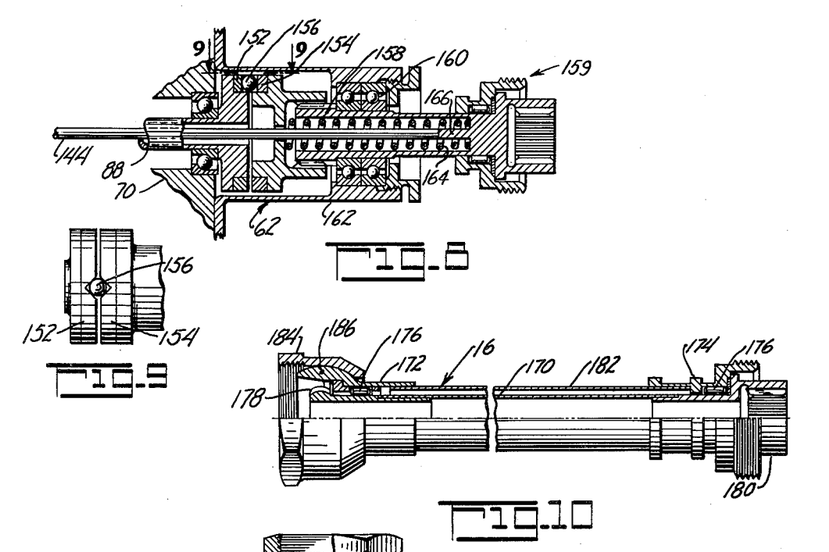
FIG. 8 is an axial section through a torque overload release clutch, preferably associated with the controlled power regulating unit.
FIG. 9 is a section on the line 9—9 of FIG. 8.
FIG. 10 is a longitudinal section through a high speed transmission shafting unit.

Reference may now be made to FIGS. 8 and 9 wherein, in FIG. 8, a portion of the power regulator housing 70 is shown along with the power regulator output shaft 88 and the servomotor feedback shaft 144. Shaft 88 drives a notched cam 152 which faces another notched cam 154, there being one or more bearing balls 156 between the cams which, when engaged in the cam notches, serve to transmit power solidly from cam 152 to cam 154. Cam 154 is splined to an output shaft 158 held in thrust and radial bearings 160 in a housing 162. A strong spring 164 bears at its ends on portions of the cam 154 and shaft 158 and urges them apart, urging cam 154 toward the cam 152. This spring loads the cams and balls 156 to enable transmission of torque to a determinate maximum value from cam 152 to shaft 158, the torque limit being established by the strength of the spring 164 and the notch angles of the cams 152 and 154. Should the output shaft 164 be bound so that it cannot be turned below the torque limit of the device 62, the balls 156 will slip out of their notches and shaft 88 will turn relative to the output shaft 158 until output shaft binding is released or until input shaft power application is terminated whereupon the balls will reengage the cam notches. Since the position of shaft 158 represents the position of the load which it drives, the position feedback reflected to the power regulator through the shaft 144 is taken from the shaft 158 to avoid improper indexing between control input and load. Shaft 144 is integral with or secured to the shaft 158 at a point such as 166.

Figure 11:
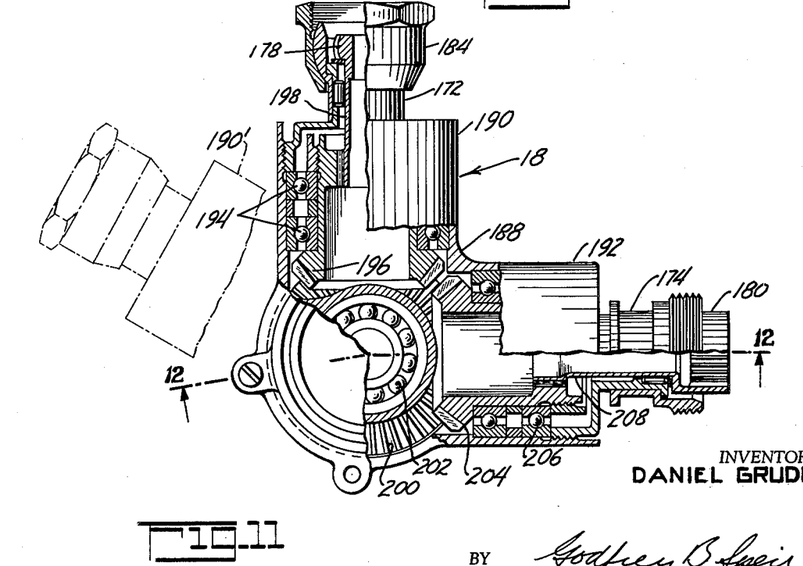
FIG. 11 is an elevation, partly in section, of an angle drive unit used in connection with the shafting of FIG. 10 and is a section on the line 11—11 of FIG. 12.
Figure 12:
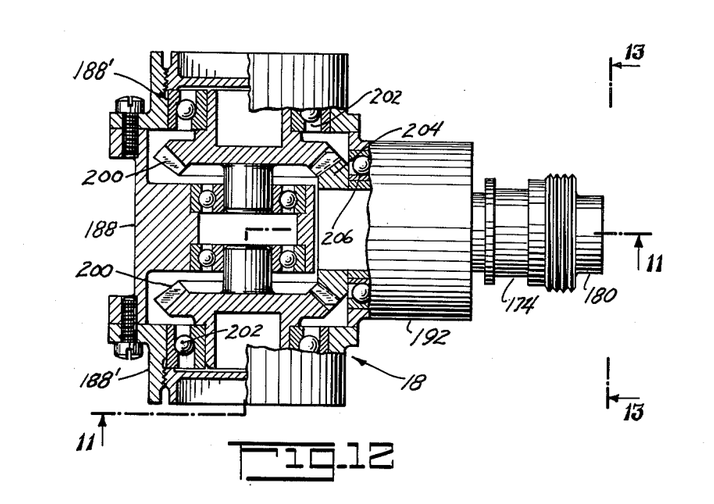
FIG. 12 is a section on the line 12—12 of FIG. 11.
Figure 13:
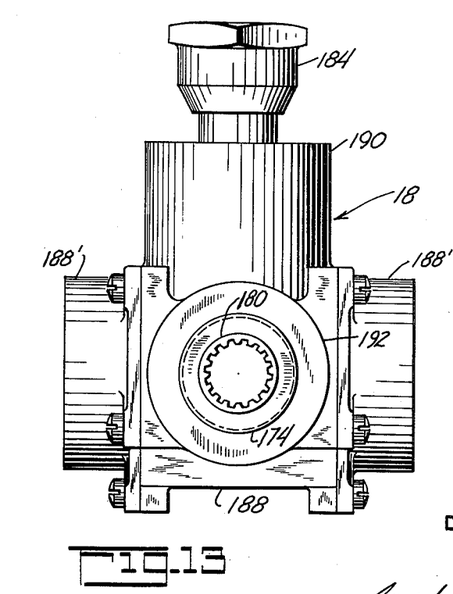
FIG. 13 is a view on the line 13—13 of FIG. 12.

The output shaft 158 of the torque limiter is provided with coupling means 159 connectable to a shaft assembly 16. Shaft 158 drives a series of the high speed shaft assemblies 16 through such coupling, which shaft assemblies include torque shafts 170, one of which is shown in FIG. 10. This shaft is carried in end fittings 172 and 174 through rollers bearings 176. One end of the shaft 170 carries an external spherical splined end portion 178 while the other end carries an internally splined coupling 180. In the FIG. 10 arrangement, the externally splined portion 178 of the next succeeding shaft element engages the internal coupling 180 so that rotational drive is continuous with more or less standardized components from the power regulator all the way to the load element of the system. The output shaft 158 of the torque limiter connects to the left end of shaft assembly 16 as viewed in FIG. 10 through the coupling means 159, which coupling means is of the type shown at the right end of shaft assembly 16. The housings 172 and 174 are joined by a tubular protective covering 182, also the housing such as 174 is provided with an external threaded portion which may be engaged by a nut 184 embracing the housing 172 at a spherical joint 186. Through these couplings, a series of drive shaft units can be securely coupled in series to provide an articulating shaft system wherein each element of the shaft system is relatively rigid. Such a shaft system is secured at intervals to supporting structure and preferably, each shaft assembly as in FIG. 10 is secured at one or more points to the supporting structure. Such attachment may be at any point along the shaft assembly since the protective tubing 182 and the joint connections at the ends of the shaft assembly are all sufficiently rugged for this purpose.

Where it is necessary or desirable to make sharp bends in the transmission shafting system, angle drives 18, such as are shown in FIGS. 11–13, may be incorporated. Such an angle drive comprises a housing 188 having limbs 190 and 192 respectively for power input and power output. FIG. 11 shows an alternative limb 190' disposed at a different angle from that of the limb 190. Limb 190 contains bearings 194 holding a bevel gear 196 which is coupled by a sleeve 198 to an external ball spline element 178 as in FIG. 10, the limb also having housing end nut elements like 172 and 184 of FIG. 10. Bevel gear 196 meshes with opposed side gears 200, each independently borne in housing portions 188' through bearings 202. The opposed side gears 200 engage a bevel gear 204 journalled in the limb 192 on bearings 206, bevel gear 204 being coupled through a sleeve 208 to an internal splined coupling like 180 in FIG. 10. The limb 192 also carries a housing element 174 to which a nut 184 may be secured to enable drive to the next shafting assembly. This angle drive arrangement provides four gear tooth driving engagements through the use of side gears 200 and also provides for flexibility in the drive angle merely through modification of the shape of housings 188. The same bevel gears and side gears may be used regardless of the angle of drive. Were a simple bevel gear drive used for the angle driving arrangement (which can be done if desired), only a single tooth engagement is secured, thereby lessening torque capacity of the system and each different angle of drive would require an entirely different set of special bevel gears. Thus, the angle drive, as disclosed, provides higher torque capacity and also a degree of standardization of parts not otherwise available. Minor variations in this angle drive will be apparent to those skilled in the art, including those which would be needed to provide T or cross drives having respectively three and four-drive couplings.

Transmission lines comprising shaft assemblies 16 and angle drives 18 are used between the powerplant and the servomotors and also between the power regulators and the load devices to be driven. In the latter, drive shafting terminates as shown in FIG. 2 at the gear unit 64 by which driving power is distributed to one or more speed reducing rotary actuators 20.

In the design of the transmission shafting for aircraft and other applications where structural support for the system is somewhat resilient, care should be exercised to make sure that elements of the shafting system are adequately designed to avoid deflections and resonant vibration, particularly at their full operating speed. It may be desirable to decouple shafting from structural supports by vibration isolating attachments. Ordinarily, shaft assemblies 16 would be designed for certain maximum length, calculated to have a natural vibration frequency in excess of, or out of the range of, forcing vibrations which are expected to be encountered in system operation.

Figure 5:
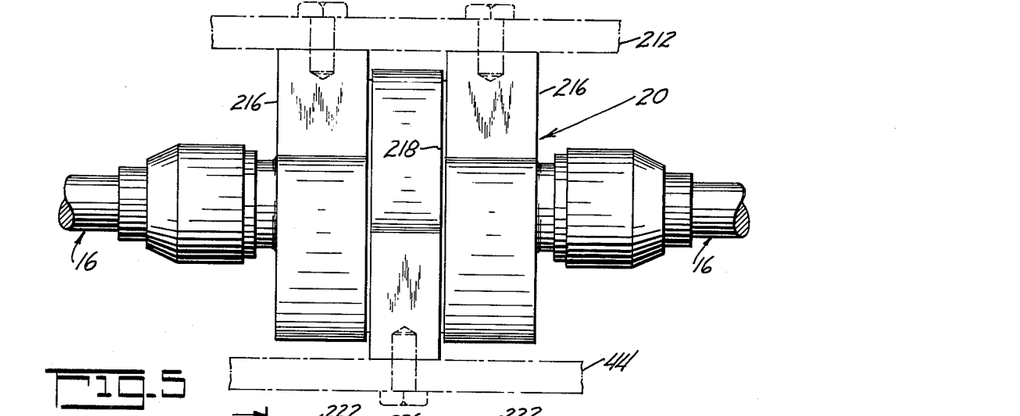
FIG. 5 is a plan of a multiple shear hinge device utilized at the load carrying end of the power control system.
Figure 6:
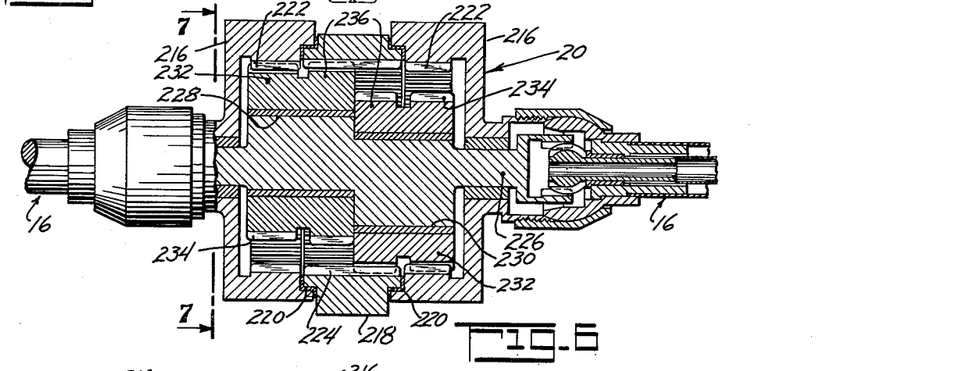
FIG. 6 is an axial section of the hinge device of FIG. 5.
Figure 7:
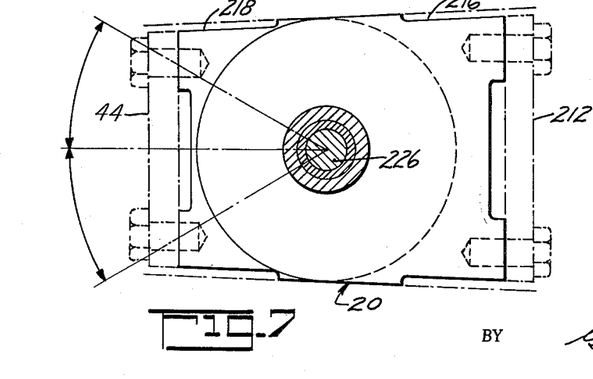
FIG. 7 is a section on the line 7—7 of FIG. 6.

An example of one form of rotary actuator or power actuated hinge device is shown in FIGS. 5–7. Therein a portion of supporting structure such as a wing is shown at 212 and a portion of the movable structure or flap is represented by 44. These portions are joined and hinged with respect to each other by one or more of the units 20, each unit 20 being constructed both as a hinge for the two structural parts and also as a speed reducing driving device to cause relative oscillation of the members 212 and 44. Fixed hollow members 216 are secured to the member 212 and embrace a hollow member 218 secured to the member 44. These are hingedly borne with respect to each other by bearings 220. The bearings may either be low friction lubricated bushings or antifriction bearings. The interiors of member 216 are formed as internal gears 222 and the interior of the member 218 is formed as an internal gear 224, there being a slightly different number of teeth between the gear 222 and the gear 224. Coaxial with and borne in end plates of the gears is a high speed shaft 226 provided with end couplings as shown, and similar to those already described so that they may be connected with shaft assemblies 16. Shaft 226 is provided with two eccentric journals 228 and 230 which are formed diametrically opposite to one another, each journal carrying a compound planet pinion 232 having a pinion portion 234 engaging the internal gear 222 and a pinion portion 236 engaging the internal gear 224. This gearing arrangement comprises a compound epicyclic train so that a high reduction ratio is afforded between rotation of the shaft 226 and rotation of the member 218 relative to the members 216. This hinge device, as shown, is analogous to one of the forms of the devices disclosed in my co-pending patent application Serial No. 782,537 filed December 23, 1958, and provides a compact and efficient unit for applying power to a load device. Other forms of actuators, linear or rotary, may be used as desired according to the type and function of the load device.

Because of the high reduction ratio of the hinge device, it becomes essentially irreversible so that load reaction on the movable loaded member or flap is not transmitted into the transmission and power subsystems, nor into the servo control. This feature is highly desirable, as the hinge device will absorb load fluctuations on the driven member in any position at which it may be set, without load feedback. Should hinge reduction ratios be so low as to make the hinge reversible, a self-energizing or servo-energizing brake may readily be incorporated at or near each hinge device or actuator.

The all-mechanical nature of the invention enables selection of available materials and lubricants capable of sustained operation in high temperature environments, free of the limitations which are ordinarily inherent in other types of systems.

In the foregoing description I have set forth the general scheme of my invention, the general considerations which are applicable to its use, and have also described typical and practical components which together constitute the system. Some of these components are not necessarily new per se. However, their combination into a system as described and claimed enables the construction of a system which is considered to be a considerable advance in the art.

It is fully contemplated that it is within the scope of the invention to apply it to sundry other types of machinery than aircraft, even though an aircraft application has been emphasized herein. Accordingly the following claims are intended to define the scope of the invention for any appropriate application thereof.

It will be clear to those skilled in the art that various changes and modifications may be made in the structure shown and described without departing from the spirit and scope of the invention as set out in the appended claims.

I claim:

1. In an aircraft, a pilot's control, a power source, a power regulator connected with the power source, an output shaft rotatable by the regulator, mechanism connected to the pilot's control for initiating operation of the regulator and rotation of the output shaft upon movement of the pilot's control, a feedback connection between the output shaft and said mechanism for eliminating operation of the regulator and rotation of the output shaft upon cessation of movement of the pilot's control, substantially fixed structure on the aircraft, a movable control surface adjacent to the fixed structure, a plurality of hinged mechanisms between the fixed structure and the control surface each including a part secured to the fixed structure and a relatively rotatable coaxial part secured to the control surface, and shafting coaxial with said hinged parts for moving the relatively movable hinged parts to thereby operate the control surface, said shafting being operatively connected to said power regulator.

2. In an aircraft, a pilot's control, a power source, a power regulator connected with the power source, an output shaft rotatable by the regulator, mechanism connected to the pilot's control for initiating operation of the regulator and the rotation of the output shaft upon movement of the pilot's control, a feedback connection between the output shaft and said mechanism for eliminating operation of the regulator and rotation of the output shaft upon the cessation of movement of the pilot's control, substantially fixed structure on the aircraft, a movable control surface adjacent to the fixed structure, a plurality of hinged mechanisms between the fixed structure and the control surface, each including portions secured to the fixed structure and a relatively rotatable coaxial part between said portions secured to the control surface, and shafting coaxial with said portions and said part of each of hinged devices for moving the relatively movable coaxial parts to thereby operate the control surface, said shafting being operatively connected to said power regulator.

3. In an aircraft, a pilot's control, a power source, a power regulator connected with the power source, an output shaft rotatable by the regulator, mechanism connected to the pilot's control for initiating operation of the regulator and rotation of the output shaft upon movement of the pilot's control, a feedback connection between the output shaft and said mechanism for eliminating the operation of the regulator and rotation of the output shaft upon the cessation of movement of the pilot's control, substantially fixed structure on the aircraft, a movable control surface adjacent to the fixed structure, a plurality of hinged mechanisms between the fixed structure and control surface extending over a major portion of the length of the control surface, said hinged mechanisms each including a part secured to the fixed structure and a relatively rotatable coaxial part secured to the control surface, and shafting coaxial with said hinged parts for moving said relatively rotatable coaxial hinged part to thereby operate the control surface, said shafting being operatively connected to said power regulator.

4. In an aircraft, a pilot's control, a power source, a power regulator connected with the power source, an output shaft rotatable by the regulator, mechanism connected to the pilot's control for initiating operation of the regulator and rotation of the output shaft upon movement of the pilot's control, a rotatable feedback connection coaxial with the output shaft connecting the output shaft to said mechanism for eliminating operation of the regulator and rotation of the output shaft upon the cessation of movement upon the pilot's control, substantially fixed structure on the aircraft, a movable control surface adjacent to the fixed structure and mechanism operatively connected with said regulator for moving the control surface relative to the fixed structure to positions determined by movement of the pilot's control.

References Cited in the file of this patent

UNITED STATES PATENTS

| | | |
|---|---|---|
| 2,175,584 | Zand | Oct. 10, 1939 |
| 2,295,306 | Tampier | Sept. 8, 1942 |
| 2,417,325 | Roos | Mar. 11, 1947 |
| 2,761,297 | Buchsteiner | Sept. 4, 1956 |